United States Patent
Sexton et al.

(10) Patent No.: US 6,349,208 B1
(45) Date of Patent: Feb. 19, 2002

(54) APPARATUS AND ASSOCIATED METHOD FOR SELECTIVELY PERMITTING INITIATION OR CELL RESELECTION IN A RADIO COMMUNICATION SYSTEM

(75) Inventors: Thomas A. Sexton, Fort Worth; Riku P. Pirhonen, Coppell, both of TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/301,037

(22) Filed: Apr. 28, 1999

(51) Int. Cl.[7] .................................................. H04Q 7/20
(52) U.S. Cl. ........................ 455/439; 455/560; 455/442; 455/434; 455/515; 370/332
(58) Field of Search ................................ 455/439, 442, 455/438, 437, 436, 434, 515, 67.1, 560, 561; 370/331, 332, 333

(56) References Cited

U.S. PATENT DOCUMENTS 5,822,699 A * 10/1998 Kotzin et al. ............... 455/447
5,864,578 A * 1/1999 Yuen .......................... 370/331
6,108,374 A * 8/2000 Balachandran et al. ..... 375/227
6,215,811 B1 * 4/2001 Yuen .......................... 455/436
6,252,861 B1 * 6/2001 Bernstein et al. ........... 370/331

* cited by examiner

Primary Examiner—Edward F. Urban
Assistant Examiner—Rafael Perez-Guierrez
(74) Attorney, Agent, or Firm—Federico Fraccaroli (57) ABSTRACT

A method, and associated apparatus, predicts the likelihood of successful effectuation of handover in a cellular communication system. Handover is permitted only if the predicted likelihood is at least as great as a minimum threshold. If the predicted likelihood is less than the minimum threshold, a request is made to increase the coding rate of control signals used pursuant to the handover procedure. Handover is permitted only when the likelihood of success is predicted to be high. Thereby, the possibility of loss of communications during handover procedures is reduced.

21 Claims, 5 Drawing Sheets

APPARATUS AND ASSOCIATED METHOD FOR SELECTIVELY PERMITTING INITIATION OR CELL RESELECTION IN A RADIO COMMUNICATION SYSTEM

The present invention relates generally to cell reselection in a cellular, or other radio, communication system. More particularly, the present invention relates to apparatus, and an associated method, for selectively permitting initiation of effectuation of cellular reselection, such as a communication handover, or other control-channel-intensive event, of a mobile station operable in the communication system. A prediction is made of the likelihood that the cell reselection shall be successful. If the predicted likelihood is less than a minimum threshold, a request is made to increase the diversity, e.g., the coding rate, of control signals used in the cell reselection process. Cell reselection is permitted only when the likelihood of success is predicted to be high. Thereby, the possibility of loss of communications during the cell reselection is reduced.

BACKGROUND OF THE INVENTION

Advancements in communication technologies have permitted the implementation, and widespread usage, of multi-user radio communication systems. A cellular communication system is exemplary of such a radio communication system. Information signals generated during operation of the radio communication system are transmitted upon radio communication channels defined upon portions of the electromagnetic spectrum. Regulatory bodies allocate portions of the electromagnetic spectrum for communications in the various communication systems.

A cellular communication system includes network infrastructure which is installed throughout a geographical area which is to be encompassed by the system. The network infrastructure includes a plurality of spaced-apart radio base stations located at spaced positions throughout the geographical area. Groups of the radio base stations are coupled to a base station controller which operates to control various functions of the radio base stations. And, groups of base station controllers are coupled to mobile switching centers which perform switching operations to permit the performance of communication operations.

Each of the radio base stations defines a cell. A cell is a portion of the geographical area encompassed by the cellular communication system and positioned proximate to a radio base station. Generally, a mobile station positioned in a cell defined by a radio base station is able to communicate with such radio base station.

Cellular communication systems efficiently utilize the frequency bandwidth allocated for communications therein. Because of the positioning of the radio base stations at spaced positions throughout a geographical area, only relatively low-power signals need to be generated by the mobile station and also the radio base station to effectuate communications therebetween. The same channels can be reused throughout the cellular communication system according to a cell reuse plan. Because of such reuse of the same channels, the same channels can be concurrently used in different ones of the cells defined by the communication system.

However, because only relatively low-power signals are generated, as a mobile station travels throughout the geographical area encompassed by the cellular communication system, the mobile station cannot continue communicating with the same radio base station. That is to say, as a mobile station passes from cell-to-cell, the mobile station must communicate with successive ones of the radio base stations. Thereby, communications with the mobile station can continue as the mobile station passes through the successive cells.

In some cellular systems, the transfer of communications with the mobile station from one radio base station to another base station is referred to as a hand-off, or handover, of communications. The radio base station with which the mobile station has ongoing communications is sometimes referred to as a serving-cell and the radio base station with which a hand-off of communications is to be effectuated is sometimes referred to as a target cell. Handover of communications, or more generally, cell reselection, is a fairly complex process requiring, variously, a determination that the handover should occur, requests for, and allocation of, channel capacity at the target cell to continue communications, and, thereafter, effectuation of the handover of communications. Other control-channel-intensive events are analogously carried out as a mobile station passes from one cell to another.

In various cellular communication systems, the mobile station must be retuned from channels used at the serving-cell to channels used by the target-cell, requiring, thereby, action by both the network infrastructure and the mobile station to effectuate the handover. And, in various other systems, such as a CDMA (code-division, multiple-access) communication system, such as that defined in the IS-95 specification promulgated by the EIA/TIA, a process referred to as a soft handover is effectuated. In a soft handover, handover of communications from a serving-cell to a target-cell is effectuated without the need of the mobile station to retune to a different channel.

In other types of communication systems, analogous procedures are performed. For instance, in GPRS (general packet radio service) communications defined in a GSM (global system for mobile communications), a cell reselection procedure is effectuated in which communications between the mobile station and the serving-cell are terminated, and, thereafter, communications are restarted with the target-cell.

Handover of communications from a serving-cell to a target-cell are intended to be transparent to the use of a mobile station. That is to say, effectuation of handover of communications occurs without detection by a user. But, because a handover procedure is a relatively complex procedure, errors which might occur during the effectuation of such procedure might result in a "dropped call" or other disturbance which interferes with ongoing communications.

A manner by which to reduce the possibility that an error occurring during a control-channel-intensive event, such as handover of communications, or other cell reselection, from a serving-cell to a target-cell which might result in disruption of ongoing communications would advantageously improve operation of, and a user's perception of, communications in the radio communication system.

It is in light of this background information related to cell reselection in a radio communication system that the significant improvements of the present invention have evolved.

SUMMARY OF THE INVENTION

The present invention, accordingly, advantageously provides apparatus, and an associated method, for selectively initiating effectuation of cell reselection, or other control-channel-intensive event, in a radio communication system.

Cell reselection is permitted only if an acceptable likelihood of success of effectuation of the cell reselection is predicted. By permitting effectuation of cell reselection only if there is an acceptable likelihood that the effectuation of the cell reselection shall be successful, the possibility of a dropped call, or other undesired termination of communication, is reduced.

In one implementation, prediction is made of the likelihood of successful effectuation of the cell reselection, such as a communication handover, of a mobile station operable in a cellular communication system. If the predicted likelihood is less than a minimum threshold, effectuation of the cell reselection is not permitted. Instead, a request is made to increase the diversity of control signals transmitted between network infrastructure of the cellular communication system and the mobile station and used during cell reselection procedures. By increasing the diversity of the control signals, the likelihood that such control signals shall be accurately detected and acted upon is increased. Thereby, subsequent cell reselection is more likely to be effectuated successfully.

In one implementation, predictions are made dynamically, that is to say, subsequent to increasing the diversity of the control signals, and prediction is again made as to the likelihood of successful effectuation of cell reselection. If the predicted likelihood of successful effectuation is of at least an acceptable level, cell reselection is permitted.

In one implementation of the present invention, a mobile station is operable in a cellular communication system and is permitted to travel between cells defined in the communication system. Conventional signal monitoring techniques are carried out, to determine whether handover of communications from a serving-cell to a target-cell would be possible or appropriate. Responsive to such indications, measurements are made of the average SNR (signal-to-noise radio) of selected control signals generated during operation of the cellular communication system. When the cellular communication system is a GSM (global system for mobile communications) system, the control signals include those transmitted upon a BCCH channel. Responsive to such determinations, a likelihood of successful effectuation of handover from a serving-cell to a target-cell is predicted. If the predicted likelihood is at least an acceptable level, handover of communications is permitted. If the predicted likelihood is less than an acceptable level, a request is made to increase the diversity of the control signals, thereby to increase the possibility that the control signals are accurately detected.

In one implementation the control signals are coded at a selected coding rate. When a request is made to increase the diversity of the control signals, the coding rate at which the control signals are coded is increased.

In a further implementation, RLP (radio-link protocol) signaling is utilized in which ARQ response messages are generated responsive to detection of RLP messages. The probability that all of the messaging required of a handover exchange is successful is computed. The computed probability forms the prediction of the likelihood that effectuation of the handover shall be successful. If the computed probability is less than a minimum level, a request is made to increase the coding rate at which control signals are encoded. If, conversely, the computed probability is greater than the threshold probability level, effectuation of the handover is permitted.

In one implementation, when a potential for handover of communications from a serving-cell to a target-cell exists, determined e.g., through a conventional neighbor cell list signal energy measurements, signal-to-noise ratio measurements of control signals communicated between the serving-cell and mobile station, and also between the target-cell and the mobile station, are made. Mean values of the signal-to-noise ratios are determined as is also a standard deviation of the signal-to-noise ratios. From such determinations, a density of the block error rate, at a specific channel coder rate, is determined. Then, message delays based upon correlated, or independent, message failures are modeled. And, the probability that an ARQ process of RLP signaling used in handover procedures shall terminate without completing successful message transmission is computed. From the computed probability, a probability is computed that the entire handover exchange is successful. This probability is compared against a threshold value. If the computed probability is less than the threshold value, a request is made to increase the coding rate of the control signals. Otherwise, the likelihood of successful effectuation of handover is at least an acceptable level, and effectuation of the handover is permitted.

In one embodiment, a mobility manager, forming a portion of the network infrastructure of a cellular communication system is operable to make the determinations and computations required to predict the likelihood of successful effectuation of the handover. In various implementations, the mobility manager forms part of a base station controller, mobile switching center, or SGSN of the network infrastructure of the communication system.

In these and other aspects, therefore, a method, and an associated apparatus, selectively initiates effectuation of a control-channel-intensive event for communications by a mobile station in a radio communication system. The radio communication system has a serving-cell, fixed-site radio transceiver and at least one target-cell fixed-site radio transceiver. The serving-cell, fixed-site transceiver defines a serving-cell, and the at least one target-cell, fixed-site transceive defines a target-cell. A parameter associated with a signal-to-noise ratio of selected control signals generated by the serving-cell, fixed-site radio transceiver are determined. Responsive to values of the determined parameters, a likelihood of successful effectuation of the control-channel-intensive event is predicted. If the likelihood of successful effectuation is predicted to be less than a minimum selected threshold, the selected control signal generated by at least the target-cell, fixed-site radio transceiver are requested to be of increased diversity levels. Conversely, if the likelihood of successful effectuation of the control-channel-intensive event is predicted to be of at least an acceptable threshold, initiation of the effectuation of the cell reselection is permitted.

A more complete appreciation of the present invention and the scope thereof can be obtained from the accompanying drawings which are briefly summarized below, the following detailed description of the presently-preferred embodiments of the present invention, and the appended claims.

DETAILED DESCRIPTION OF THE PREFERRED EMBODIMENT

Figure 1:
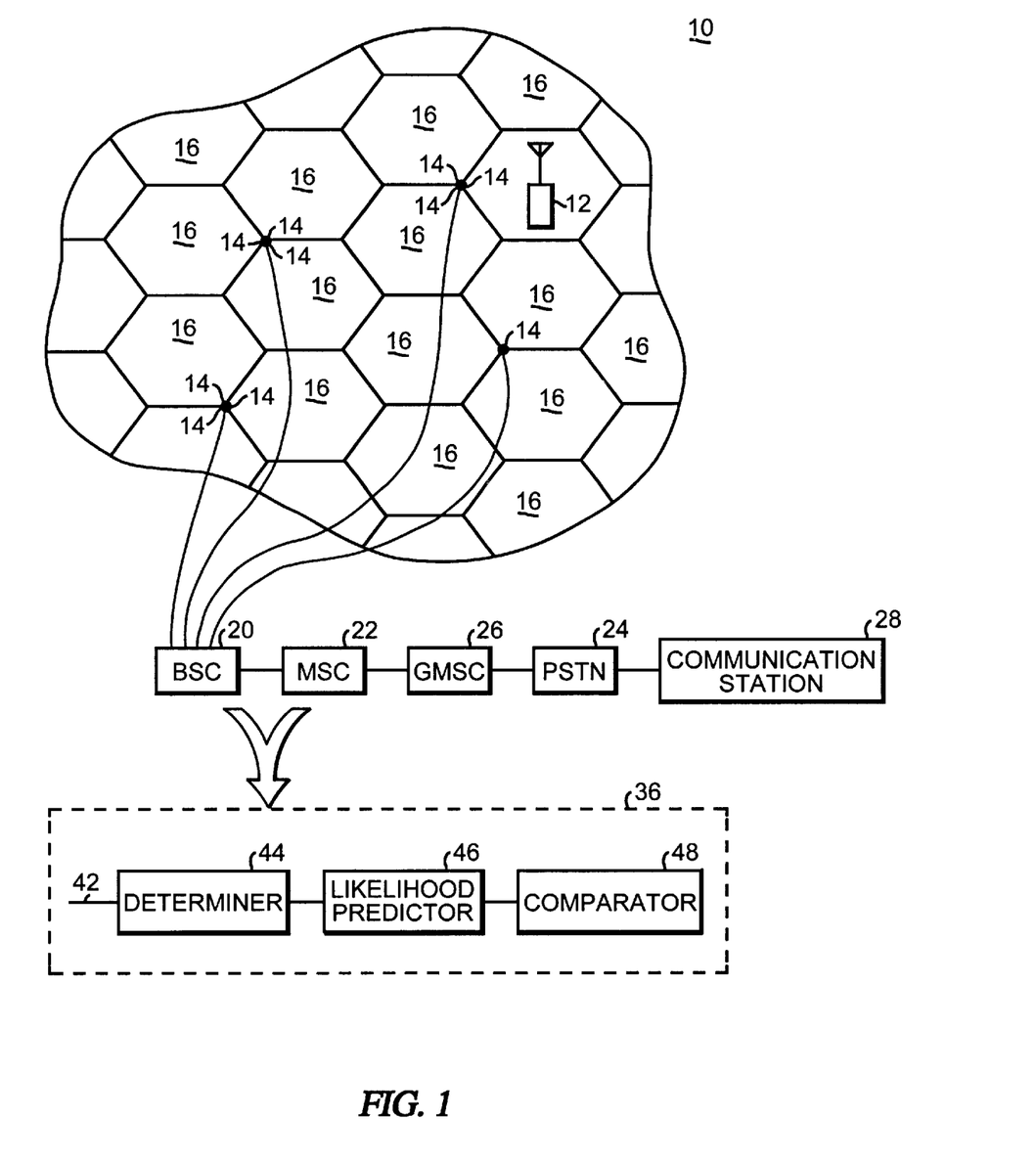
FIG. 1 illustrates a portion of a cellular communication system, exemplary of a radio communication system in which an embodiment of the present invention is operable.

Referring first to FIG. 1, a portion of a cellular communication system, shown generally at 10, provides for wireless communications with mobile station positioned within the geographical area encompassed by the system. An exemplary mobile station 12 is shown in the Figure. A user of a mobile station, sometimes referred to as a subscriber as the user subscribes to service in the communication system, is able to communicate telephonically when positioned at almost any location within the area encompassed by the communication system. The cellular communication system 10 shown in the Figure is exemplary of a cellular system constructed pursuant to any of various cellular communication standards, including, for instance, systems constructed pursuant to an IS-95, IS-54, and GSM standards promulgated by various standards bodies.

The cellular communication system 10 includes a plurality of spaced-apart radio base stations 14 positioned at spaced intervals throughout the graphical area to be encompassed by the communication system. The radio base stations 14 are fixed-site radio transceivers capable of multi-user communications. In the exemplary implementation shown in the Figure, groups of three radio base stations 14 are co-located. Each radio base station 14 forms a sector cell 16. For purposes of illustration, the cells 16 are represented to be hexagonal in configuration.

Groups of the radio base stations 14 are coupled to a BSC (base station controller) 20 of which a single BSC 20 is shown in the Figure. A BSC is operable to control operation of the radio base stations coupled thereto. Groups of BSCs are coupled to an MSC (mobile switching center) 22, of which a single MSC 22 is shown in the Figure. An MSC is operable, amongst other things, to perform switching operations. The MSC 22 is coupled to a PSTN (public-switched telephonic network) 24 by way of a GMSC (gateway mobile switching center) 26. And, the PSTN is coupled to communication stations, such as the communication station 28.

When a user operates the mobile station to communicate telephonically therethrough, communications are typically effectuated with the radio base station which defines the cell in which the mobile station is located. Such radio base station is sometimes referred to as a serving-cell. As the mobile station travels through the geographical area encompassed by the communication system, the mobile station might travel out of a cell serviced by the serving-cell and enter a cell serviced by another radio base station, a target-cell. Handover of communications from the serving-cell to the target-cell are typically effectuated so that communication between the mobile station and the network infrastructure can continue. And, during other operation of the communication, other control-channel-intensive events might occur, e.g., negotiation of a new service option.

As described above, handover procedures are fairly complex and call dropping or other communication disturbance is of increased susceptibility during effectuation of handover from a serving-cell to a target-cell. Other control-channel-intensive events are analogously of increased susceptibility of failure when the mobile station passes from one cell to another.

The network infrastructure of the communication system 10 includes the functionality of a mobility manager 36, here represented functionally, and formed, in exemplary implementations of the present invention, at either the BSC 20, MSC 22, or combinations of both such elements. In a system having an SGSN, such as a GSM cellular communication system which provides GPRS (general packet radio service), the functionality of the mobility manager may further, or alternately, be embodied therein. At least portions of the mobility manager are implemented in the exemplary embodiment of the present invention by algorithms executable by appropriate processing circuitry.

The mobility manager 36 is here shown to include a determiner 38 coupled to receive indications on the line 42 which indicate at least when a handover of communications from a serving-cell to a target-cell is possible. The determiner is operable to determine the signal-to-noise ratio, E, of control signals communicated between the serving-cell and the mobile station. In a GSM system, for instance, such control signals include messages generated on a broadcast control channel (BCCH), transmitted upon a forward-link path by the radio base stations, both the serving-cell and the target-cell. The determiner 44 further determines standard deviations of the values of E.

Determinations made by the determiner 44 are provided to a likelihood predictor 46. The likelihood predictor 46 is operable, responsive to the values determined by the determiner 44, to predict the likelihood of successful effectuation of the handover. The likelihood predictor 46 makes the prediction based upon calculations of a density of a block error rate, models message delays based upon correlated or independent message failures, computes the probability that an ARQ process used in signaling of messages between the mobile station and the radio base stations shall fail, before completing a successful message transmission, and from such information, computes a probability that an entire handover exchange shall be successful.

Indications of the values of the predictions made by the likelihood predictor 46 are provided to a comparator 48. The comparator 48 is operable to compare the values of the predicted likelihood with a threshold value. If the value is beneath the threshold, a request is made to increase the coding rate at which the control signals are encoded, or otherwise to increase the diversity of such signals, thereby to increase the possibility that the signal shall be subsequently detected with an acceptable degree of accuracy. If, conversely, the values predicted by the likelihood predictor are above the threshold, effectuation of the handover is permitted.

The mobility manager 36 is operable to permit handover communications with the mobile station 12 from a serving-cell to a target-cell only if successful effectuation of the entire handover exchange is predicted to be likely. And, if successful effectuation of the handover is not well-enough assured, based on the prediction, the coding rates of control signals utilized in the handover exchange is increased, thereby to improve the likelihood that the control signals can be adequately detected to permit subsequent permission to effectuate the handover exchange.

Figure 2:
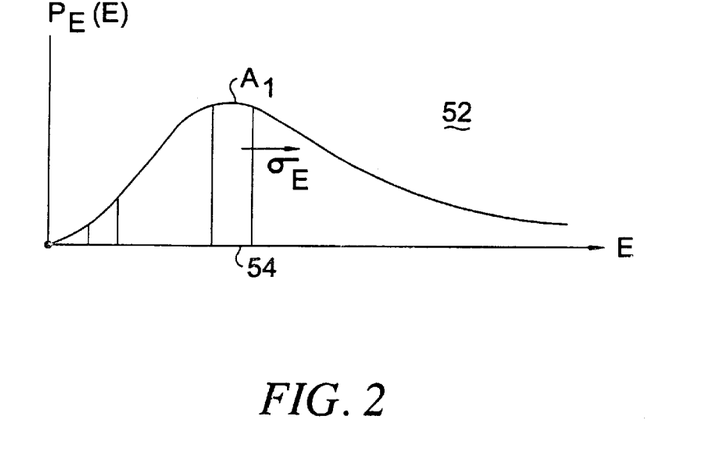
FIG. 2 illustrates a graphical representation of a probability density of a signal-to-noise ratio determined during operation of an embodiment of the present invention.

FIG. 2 illustrates a probability density 52 in which the probability of occurrence of a measured signal-to-noise ratio, $E_b/N_o$ shall occur. In the plot, the probability of occurrences plotted as a function of the signal-to-noise ratio, here referred to as E. The value of E is that which is observed by a mobile station, such as the mobile station 12 shown in FIG. 1. The probability density is exemplary, and the actual configuration of such a probability density would vary corresponding to operating conditions.

Review of the probability density 52, however, indicates the density to be lognormally distributed, and to exhibit a standard deviation $\sigma_\epsilon$, away from a mean power, here at a value of E corresponding to the point 54. The mean value of E, herein referred to as $E_m$, observed by a mobile station, in dB as a function of range, r, away from a serving-cell is represented mathematically as:

$$E_m(r) = P_o - 10\log_{10}(r^n) + A - L_{lm} - (-173 + NF + 10\log_{10}(BW)) - \log_{10}(1/R)$$

wherein:

$P_o$ is a base-site, Effective Radiated Power in the direction of the mobile station;

n is a path loss exponent;

A is an antenna gain of the mobile station;

$L_{lm}$ is the path loss of a radio base station antenna at a range of 1 meter at a carrier frequency of interest;

kT is −173 dBm/Hz;

NF is a noise figure of a receiver portion of the mobile station;

BW is an effective noise bandwidth of a receiver portion of the mobile station; and R is a coding rate of a channel coder by which control signals are encoded during operation of the cellular communication system. In an exemplary implementation of the present invention, one channel symbol conveys one channel bit, and which conveys 1/R information bits.

Lognormal shadowing results in a probability density function for the random variable E as follows:

$$f_E(E) = \frac{10}{\left(E\sqrt{2\pi}\,\sigma\ln 10\right)} \exp[10(\log_{10}E - E_m)^2/2\sigma^2]$$

wherein the variables are as defined above.

Digital cellular communication systems typically make use of convolutional encoders at both the radio base stations and the mobile stations operable in such a system. A convolutional encoder is operable to convolutionally encode blocks of data. By encoding the blocks of data, the data is more likely to be recoverable subsequent to transmission upon a transmission channel when the communication conditions are less than ideal. Various of such convolutional encoders permit the effectuation of various different coding rates at which to encode signals. Selection of coding rate is made responsive to the desired throughput rates and desired quality levels. During operation of an embodiment of the present invention, the coding rate is maintained at a selected level and is only increased if communication conditions necessitate such increase.

In a typical cellular communication system, such as a system specified in the GSM standard, handover of communications with a mobile station from a serving-cell to a target-cell requires the transmission of messages on a control channel, a BCCH, to permit the effectuation of the handover. In an ARQ procedure, when a message is transmitted and received, an acknowledgment is provided indicating the receipt of the message. If the message is lost for some reason, indicated by failure to have such message acknowledged, the message must be retransmitted. Four basic protocols are involved in the management of retransmission: Stop and Wait, Go Back N, windowed protocols and incremental redundancy.

The Go Back N protocol is exemplary and involves the transmission of a message, $M_1$. When the message $M_1$ is sent, a timer, $T_1$, is started with a value of N. Subsequent messages, e.g., $M_2 \ldots M_N$ are subsequently sent, each starting a timer, $T_2, \ldots T_N$ respectively.

If an acknowledgment for $M_1$ is received prior to the expiration of $T_1$, $T_1$ is canceled and $M_1$ is discarded from a transmit queue. If, conversely, timer $T_1$ times-out, without detection of an acknowledgment, $T_1$ is reset to N, and the process repeats, resulting in transmission of $M_2 \ldots$.

The conditional discrete probability density of the delay, D, experienced using this Go Back N protocol is defined by the following equation:

$$fD,\text{slow}(D=1+kN|x)=(1-x)x^k$$

where x is the probability of a single message failure.

If greater the NA number of selected of messages are transmitted, here $k_{max}$, without the detection of acknowledgments, the connection with the mobile station is cleared, that is to say, the call with the mobile station is dropped. The collective event of retransmissions is referred to as the ARQ process.

Various messages are required to effectuate handover from a serving-cell to a target-cell. The three messages include an energy report message transmitted by the mobile station to its serving-cell, a handover direction message transmitted by the serving-cell to the mobile station, and a handover acknowledgment transmitted by the target-cell to the mobile station.

The energy report and the handover messages exist explicitly in a MAHO (mobile assisted handover) system, such as the aforementioned GSM system. The handover acknowledgment message is sometimes instead achieved implicitly by the reception of traffic information on a designated channel. Handovers are constrained to merely-simultaneous communication with both serving and target-cells due to the need to exchange uninterrupted real-time voice traffic. Each of the messages is transmitted in a block, e.g., in a 244-bit information block.

Figure 3:
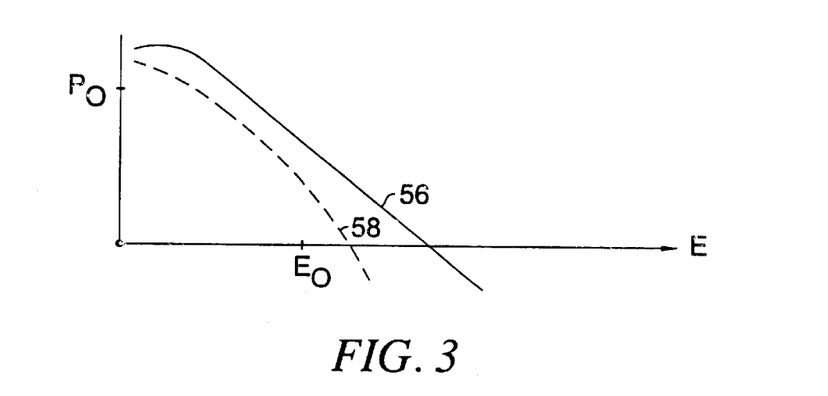
FIG. 3 illustrates a graphical representation of the probability of a lock error rate as a function of signal-to-noise ratio, the values of which are plotted in the graphical representation of FIG. 2.

FIG. 3 illustrates a graphical representation of the probability of a block error at different values of E at a specific coding rate. The curve 56 plotted in the Figure indicates that, as the value of E increases, the probability of the occurrence of a block error decreases. And, the curve 58, shown in dash, is a corresponding plot but at an increased coding rate. Comparison of the plots 54 and 56 illustrates that, as the coding rate is increased, the probability of the occurrence of a block error for a given value of E decreases.

Figure 4:
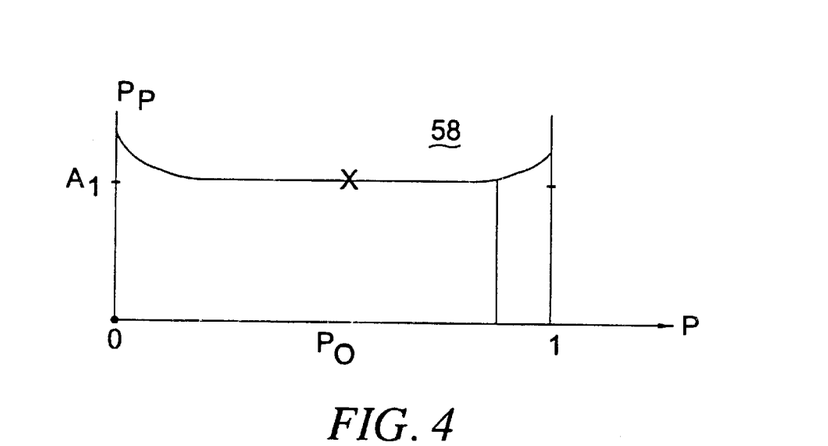
FIG. 4 illustrates a graphical representation of a probability density of the probability of the block error rate shown in the graphical representation of FIG. 3.

FIG. 4 illustrates a probability density 58. The probability density 58 is the probability of the probability of the occurrence of a block error shown in graphical representation of FIG. 3. That is to say, the probability density 58 provides the probability density formed as a function of the probability of the occurrence of a block error.

Figure 5:
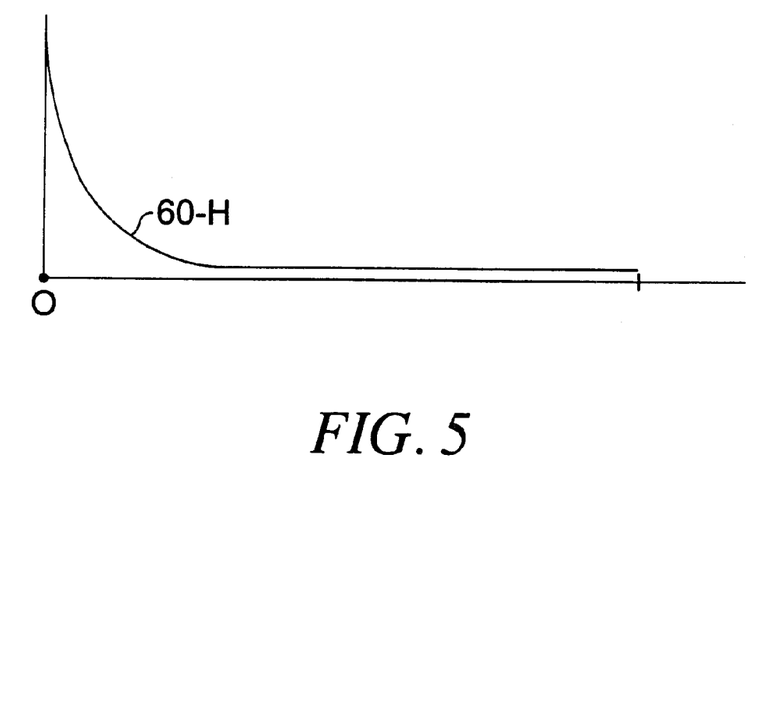
FIG. 5 illustrates a graphical representation of the probability of the block error rates, upon which the graphical representation shown in FIG. 4 when the signal-to-noise ratio is of a high value.
Figure 6:
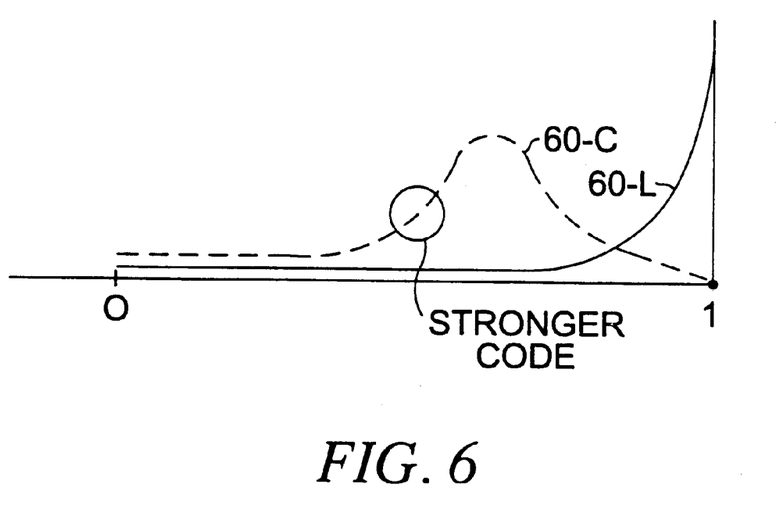
FIG. 6 illustrates a graphical representation, similar to that shown in FIG. 5, but when the signal-to-noise ratio is relatively low, and, shown in the Figure at the same signal-to-noise ratio, but at an increased coding rate.

FIGS. 5 and 6 illustrates plots of the density of the block error rate at two different values of E. FIG. 5 illustrates plot 60-H, representative of the density of a block error rate when the value of E is relatively high. And, the 60-L shown in FIG. 6 is a plot of the density of the block error rate when the value of E is relatively low. Comparison of the plot 60-H and 60-L indicates that the probability of the occurrence of block errors is greater when the value of E is low. FIG. 6 further illustrates a plot 60-C illustrating the density of the block error rate when the value of E is relatively low, but the coding rate is increased.

Figure 7:
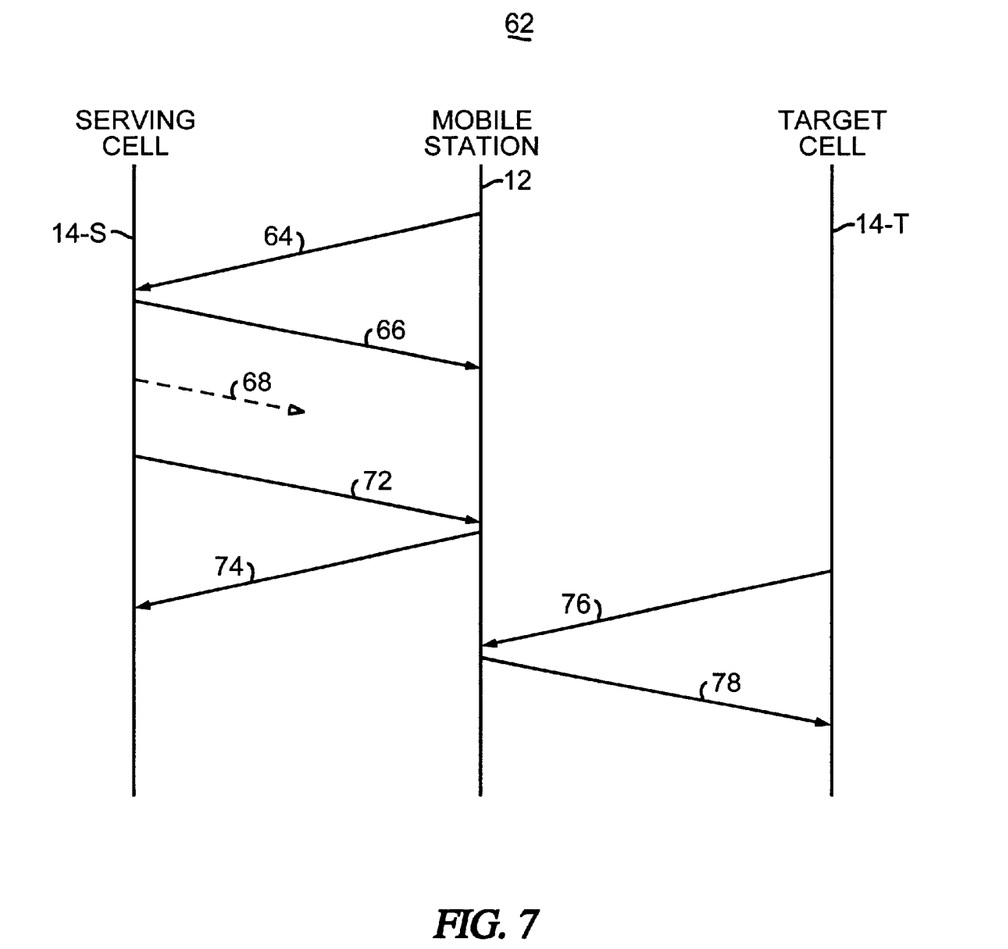
FIG. 7 illustrates a sequence diagram showing the signaling of messages during a handover of communications.

FIG. 7 illustrates a sequence diagram, shown generally at 62, representative of the signaling of the above-described to execute a handover. First, an energy report message 64 is sent by the mobile station 12 to the serving-cell, here designated at 14-S. An acknowledgment 66 is communicated by the serving-cell 14-S back to the mobile station. A handover direction message 68 is then communicated by the serving-cell to the mobile station. The message 68 is here shown, for purposes of illustration, not to be received at the mobile station and no acknowledgment is thereby provided by the mobile station back to the serving-cell. Under the above, when a timer times out with no acknowledgment of a transmitted message, the message is resent, here indicated by the retransmission of the handover direction message, designated by 72, received at the mobile station and receipt of the message is acknowledged indicated by the response 74. Thereafter, subsequent to handover, the handover acknowledgment message, either an explicit message or an implicit message, noted above, is provided by the target-cell here designated by 14-T, and is sent to the mobile station. The handover acknowledgment message is here represented by the message 76 which again the mobile station acknowledges by the acknowledgment 78.

The equation described above is representative of the additional discrete probability density in slow-channel fading rate conditions. When the channel exhibits slow-fading rates, a single message attempts sequence experiences a fixed value of probability of a single message failure. That is to say, x is of a fixed value for each attempt.

However, when the channel exhibits fast-channel fading rates, distinct realizations of the probability of a single message failure must be applied for fast-channel fading rates. A fast-channel fading rate occurs, for instance, when a mobile station is traveling at a relatively high speed. In such a situation, the equation defining the discrete probability density of the delay, D, is as follows:

$$f_{D,fast}(D=1+kN|x_o, x_1, \ldots, xk_{-1}) = (1-x_o)x_1 \ldots x_{k-1}$$

wherein values of $x_i$ are independent, identically-distributed random variables with a density of $f_x(x)$.

In one implementation, the discrete probability densities of D, for both the slow-channel fading rate and the fast-channel fading rate are determined from the conditional densities by averaging numerically over the range of x.

With respect to the Go Back N protocol described above with respect to FIG. 7, effectuation of a handover is successful if each of the three messages, that is the energy report message, handover direction message, and handover acknowledge message, are all successfully transmitted using the ARQ process without exceeding a permissible, $k_{max}$, attempts. A single message is considered to be undeliverable if the random variable D takes on a value greater than $1+k_{max} N$. The probability of this occurrence is defined by the following equation:

$$\Pr\{D > 1+k_{max}N\} = 1 - F_D(1+k_{max}N)$$

wherein $F_D$ is the cumulative distribution function of D. Where either slow or fast fading conditions, the mobile station shadowing is assumed to be uncorrelated from one ARQ process to another.

The overall probability of handover success is defined, thereby, by the following equation:

$$P_{HO} = F_D(r, 1+k_{max}N)^2 F_D(r_2, 1+k_{max}N)$$

where r is the distance of the mobile station from the serving-cell; and $r_2$ is the distance of the mobile station from the target-cell site.

In the left-most multiplicand of the equation, the value is squared as two messages are communicated between the mobile station and the serving-cell while only a single message is transmitted between the mobile station and the target-cell. Values of $P_{HO}$ are compared by the comparator 48, shown in FIG. 1, against the threshold value to determine whether the probability of success is at least as high as a selected threshold. If so, handover is permitted to be effectuated; otherwise, an increase in coding rate of the control signals is requested.

Figure 8:
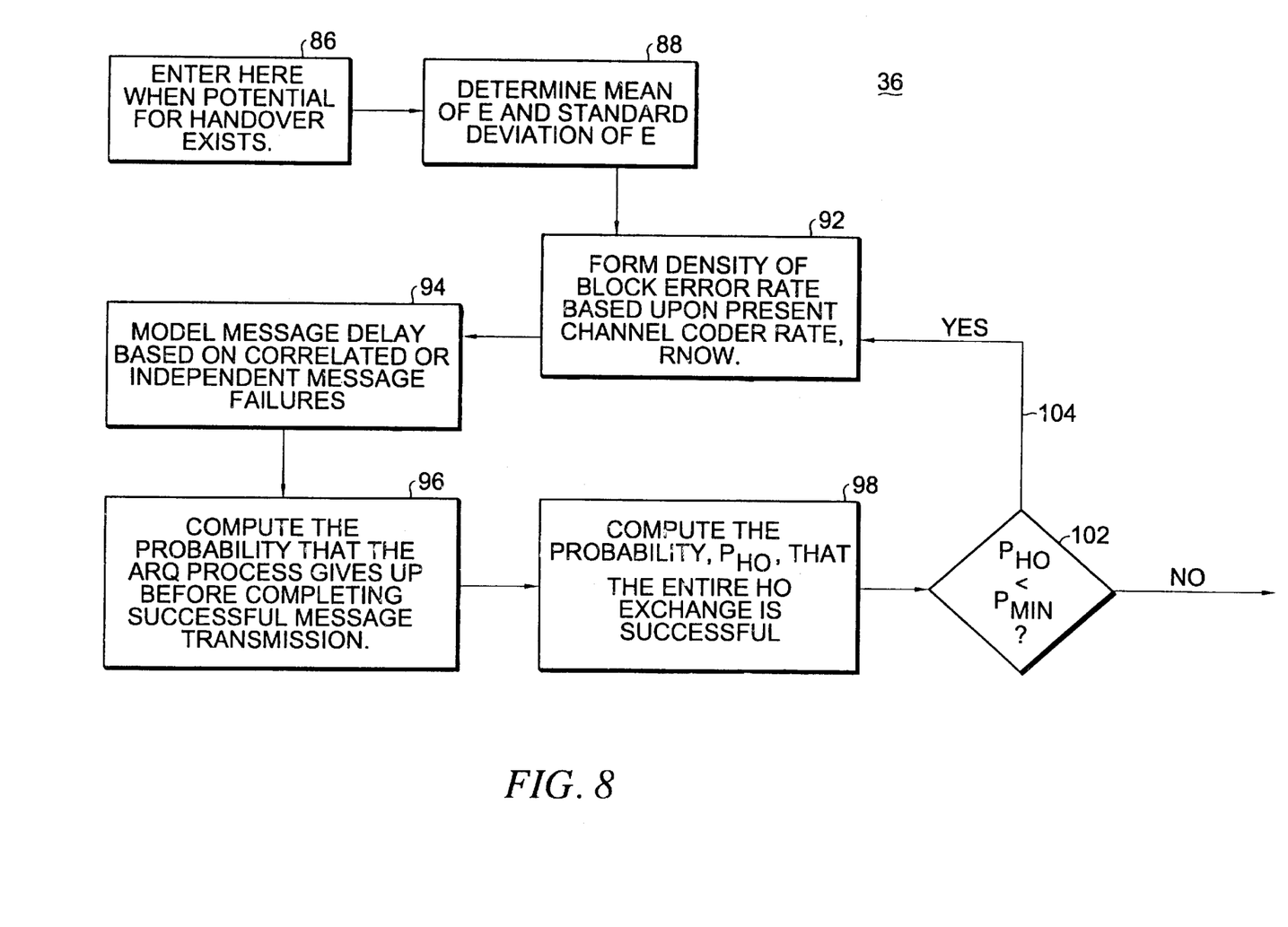
FIG. 8 illustrates a method flow diagram listing the method of operation of an embodiment of the present invention.

FIG. 8 illustrates functioning of the mobility manager 36 (shown in FIG. 1) during operation of an exemplary embodiment of the present invention. First, and as indicated by the block 86, operations commence when a potential handover exists. In the exemplary implementation shown in FIG. 1, indications of such situations are provided by way of the line 42. When a potential for handover exists, determinations are made of the mean value of E and its standard deviation, as indicated by the block 88. In the exemplary implementation of FIG. 1, such operations are carried out by the determiner 44.

Once such values are determined, the density of the block error rate, based upon an existing channel coder rate is formed, as shown by the block 97. In the exemplary implementation such function is performed by the likelihood predictor 46.

Then, and as indicated by the block 94, message delay is modeled based upon correlated or independent message failures. In the exemplary implementation of FIG. 1, such operation is performed by the likelihood predictor 46.

Thereafter, and as indicated by the block 96, the probability that the ARQ process, here the Go Back N protocol, terminates prior to the completion of a successful message transmission is computed. Again, in the exemplary implementation, such operation is carried out by the likelihood predictor 46, shown in FIG. 1. Then, and as indicated by the block 98, the probability $P_{HO}$ that the entire handover exchange shall be successful is computed. Again, in the exemplary implementation, such operation is carried out by the likelihood predictor 46.

A determination is made, as indicated by the block 102, whether the computed value of $P_{HO}$ is less than a minimum threshold value, $P_{min}$. If so, a request is made to increase the coding rate at which the control signals are generated, and a path, indicated by the line 104, is taken back to the block 92. Otherwise, the likelihood of successful effectuation of handover is predicted to be of an acceptable level and permission is granted to permit the effectuation of the handover. In the exemplary implementation, shown in FIG. 1, the operations of block 102 are carried out by the comparator 48.

The previous descriptions are of preferred examples for implementing the invention, and the scope of the invention should not necessarily be limited by this description. The scope of the present invention is defined by the following claims:

We claim:

1. A method for selectively initiating effectuation of a control-channel-intensive event for communications by a mobile station in a radio communication system having a serving-cell fixed-site radio transceiver and at least one target-cell fixed-site radio transceiver, the serving-cell fixed-site transceiver defining a serving-cell and the at least one target-cell fixed-site radio transceiver defining a target-cell, said method comprising:

determining a parameter associated with a SNR (signal-to-noise ratio) of selected control signals generated by the serving-cell fixed-site radio transceiver and the target-cell fixed-site radio transceiver;

predicting a likelihood of successful effectuation of the control-channel-intensive event responsive to values of the parameter determined during said operation of determining;

requesting that the selected control signals generated by at least the target-cell fixed-site radio transceiver be of increased diversity if the likelihood of successful effectuation of the control-channel-intensive event is predicted during said operation of predicting to be less than a minimum selected threshold; and permitting initiation of the effectuation of the control-channel-intensive event if the likelihood of successful effectuation of the event is predicted during said operation of predicting to be at least an acceptable selected threshold.

2. The method of claim 1 wherein the radio communication system comprises a GSM (global system for mobile communications) cellular communication system, and wherein the selected control signals from which the SNR of which the parameter is determined during said operation of determining comprise BCCH signals.

3. The method of claim 2 wherein the GSM cellular communication system provides for GPRS (general packet radio service) and wherein a cell reselection of which the likelihood of successful effectuation thereof is predicted during said operation of predicting comprises terminating communication of GPRS messages with the serving-cell fixed-site transceiver and initiating communication with the target-cell fixed-site transceiver.

4. The method of claim 1 wherein the control-channel-intensive event comprises a communication hand-off from the serving-cell fixed-site transceiver to the target-cell fixed-site transceiver and wherein said operation of predicting comprises predicting the likelihood of successful effectuation of the hand-off of communication.

5. The method of claim 1 wherein the selected control signals are retransmitted at selected intervals if an ARQ response fails to be detected, and wherein the increased diversity by which the selected control signals are requested to be generated comprise increased intervals at which the control signals are retransmitted.

6. The method of claim 1 wherein the selected control signals are encoded at a selected coding rate and the increased diversity by which the selected control signals are requested to be generated during said operation of requesting comprises using a code of increased error correcting capability.

7. The method of claim 1 wherein the parameter associated with the SNR and determined during said operation of determining comprises a mean value of the SNR.

8. The method of claim 2 wherein the parameter associated with the SNR and determined during said operation of determining comprises a standard deviation of the SNR.

9. The method of claim 8 wherein said step of predicting comprises the operation of forming a probability density of the SNR determined during said operation of determining.

10. The method of claim 9 wherein said step of predicting further comprises the operation of determining a probability of occurrence of an error as a function of the SNR determined during said operation of determining.

11. The method of claim 10 wherein said operation of predicting further comprises determining a probability-density of the probability of occurrence of the error.

12. The method of claim 11 wherein said operation of predicting further comprises determining levels of delay in successful delivery of the selected control signals generated by the serving-cell, fixed-site radio transceiver and the target-cell fixed-site transceiver.

13. The method of claim 12 wherein the radio communication system includes RLP (radio link protocol) signaling in which ARQ response messages are generated to acknowledge reception of selected RLP messages, wherein at least some of the selected control signals comprise RLP messages, and wherein said operation of predicting further comprises determining a probability of failing to receive an ARQ response indicating a probability of unsuccessful effectuation of the event.

14. The method of claim 13 wherein said operation of predicting further comprises determining a probability of successful effectuation of the event.

15. The method of claim 1 wherein the minimum selected threshold and the acceptable selected threshold comprise a common value.

16. The method of claim 1 further comprising the initial step of detecting when the control-channel-intensive event is available.

17. A mobility manager for selectively initiating effectuation of cell reselection for communications with a mobile station operable in a radio communication system having a serving-cell fixed-site radio transceiver and at least one target-cell fixed-site transceiver, the fixed-site radio transceiver defining a serving-cell and the at least one target-cell fixed-site radio transceiver defining at least one target-cell, said mobility manager comprising:

a determiner coupled to receive indications of selected control signals generated by the serving-cell fixed-site radio transceiver and the target-cell fixed-site transceiver, said determiner for determining a parameter associated with a SNR (signal-to-noise ratio) of the selected control signals;

a likelihood predictor coupled to receive the parameter determined by said determiner, said likelihood predictor for predicting a likelihood of successful effectuation of cell reselection responsive to values of the parameter; and a requestor coupled to receive indications of predictions made by said likelihood predictor, said requestor for requesting that the selected control signals generated by the target-cell fixed-site radio transceiver be of increased diversity if the likelihood of successful effectuation of the cell reselection predicted by said likelihood predictor is less than a selected threshold.

18. The mobility manager of claim 17 wherein the radio communication system comprises a cellular communication system having a base station controller to which the serving-cell fixed-site transceiver and the target-cell fixed-site transceiver are coupled and a MSC (mobile switching center) to which the base station controller is coupled and wherein said determiner, said likelihood predictor, and said requestor form portions of at least one of the base station controller and the MSC.

19. The mobility manager of claim 18 wherein the cellular communication system comprises a GSM (global system for mobile communications) cellular communication system providing GPRS (general packet radio service) and further having an SGSN (service gateway switching mode) and wherein said determiner, said likelihood predictor, and said requester form portions of at least one of the base station controller, the MSC, and the SGSN.

20. In a radio communication system having a serving-cell fixed-site radio transceiver and at least one target-cell fixed-site transceiver, the fixed-site radio transceiver defining a serving-cell and the at least one target-cell fixed-site transceiver defining at least one target-cell, an improvement of apparatus for selectively initiating effectuation of cell reselection for communications with a mobile station, said apparatus comprising:

a determiner coupled to receive indications of selected control signals generated by the serving-cell fixed-site radio transceiver and the target-cell fixed-site transceiver, said determiner for determining a parameter associated with a SNR (signal-to-noise ratio) of the selected control signals;

a likelihood predictor coupled to receive the parameter determined by said determiner, said likelihood predictor for predicting a likelihood of successful effectuation of cell reselection responsive to values of the parameter; and a requestor coupled to receive indications of predictions made by said likelihood predictor, said requestor for requesting that the selected control signals generated by the target-cell fixed-site radio transceiver be of increased diversity if the likelihood of successful effectuation of the cell reselection predicted by said likelihood predictor is less than a selected threshold.

21. The apparatus of claim 20 further comprising a cell reselection initiation permitter coupled to receive indications of predictions made by said likelihood predictor, said cell reselection initiator for permitting initiation of the effectuation of the cell reselection if the likelihood of successful effectuation of the cell reselection is predicted by said likelihood predictor to be at least an acceptable selected threshold.

* * * * *